(12) United States Patent
Leslie et al.

(10) Patent No.: US 9,337,704 B1
(45) Date of Patent: May 10, 2016

(54) SYSTEM FOR ELECTRICITY GENERATION BY UTILIZING FLARED GAS

(71) Applicants: Jerry Leslie, Vancouver, WA (US); Paul Stringer, Vancouver, WA (US)

(72) Inventors: Jerry Leslie, Vancouver, WA (US); Paul Stringer, Vancouver, WA (US)

(*) Notice: Subject to any disclaimer, the term of this patent is extended or adjusted under 35 U.S.C. 154(b) by 0 days.

(21) Appl. No.: 14/948,218

(22) Filed: Nov. 20, 2015

(51) Int. Cl.
| | |
|---|---|
| B60L 1/02 | (2006.01) |
| F01K 15/00 | (2006.01) |
| F01K 17/02 | (2006.01) |
| F02C 6/00 | (2006.01) |
| F02C 6/18 | (2006.01) |
| H02K 7/18 | (2006.01) |
| H02P 9/04 | (2006.01) |
| C02F 1/38 | (2006.01) |
| C02F 1/00 | (2006.01) |
| B01D 21/26 | (2006.01) |
| B01D 36/00 | (2006.01) |
| B01D 53/22 | (2006.01) |
| E21B 36/00 | (2006.01) |

(52) U.S. Cl.
CPC ............ *H02K 7/1815* (2013.01); *B01D 21/262* (2013.01); *B01D 36/00* (2013.01); *C02F 1/004* (2013.01); *C02F 1/385* (2013.01); *H02P 9/04* (2013.01)

(58) Field of Classification Search
USPC .................................... 290/2; 95/50; 166/302
See application file for complete search history.

(56) References Cited

U.S. PATENT DOCUMENTS

| | | | | | |
|---|---|---|---|---|---|
| 3,562,115 | A | * | 2/1971 | Dunlop | B01J 8/1836 165/104.16 |
| 3,589,313 | A | * | 6/1971 | Smith | B03B 9/06 110/222 |
| 3,853,498 | A | * | 12/1974 | Bailie | C01B 31/081 201/12 |
| 4,171,017 | A | * | 10/1979 | Klass | B01D 53/22 166/266 |
| 4,657,290 | A | * | 4/1987 | Linden | F02B 63/04 290/2 |
| 4,736,111 | A | * | 4/1988 | Linden | F02B 63/04 290/2 |
| 5,727,903 | A | * | 3/1998 | Borray | B01D 53/229 405/128.15 |

(Continued)

*Primary Examiner* — Pedro J Cuevas
(74) *Attorney, Agent, or Firm* — Barry Choobin; Patent 360

(57) ABSTRACT

The embodiments herein provide a system for collecting flare gas and using the same for electricity generation. A flare gas collector assembly is attached inline with a flare stack pipeline. An electric generator comprises a combustion engine and at-least alternator. An intake valve of the combustion engine is connected to a collector tank through an intake pipeline. The at-least one alternator is connected to an output shaft of the combustion engine through a transmission mechanism. The divider circuit is connected to an output node of the alternator. The battery back is connected to the at-least one alternator through the divider circuit followed a filter circuit. The primary pump is connected to the output node of the at-least one alternator through the divider circuit for pumping water from ground to a primary reservoir. The centrifuge receives water from the primary reservoir through wherein the centrifuge separates a water from undissolved solids.

10 Claims, 2 Drawing Sheets

(56) References Cited

U.S. PATENT DOCUMENTS

| | | | | |
|---|---|---|---|---|
| 6,601,543 | B2 * | 8/2003 | Rautenbach | C10L 3/10 123/3 |
| 7,094,388 | B2 * | 8/2006 | Ryan | B01D 53/04 252/373 |
| 7,559,367 | B2 * | 7/2009 | Vinegar | C10G 9/24 166/272.1 |
| 7,584,789 | B2 * | 9/2009 | Mo | C10G 9/24 166/267 |
| 7,815,713 | B2 * | 10/2010 | Sorensen | B01D 53/229 55/338 |
| 7,943,014 | B2 * | 5/2011 | Berruti | C10B 47/24 202/108 |
| 8,070,863 | B2 * | 12/2011 | Tsangaris | C10J 3/20 110/216 |
| 8,151,880 | B2 * | 4/2012 | Roes | C10G 9/24 166/267 |
| 8,156,662 | B2 * | 4/2012 | Carin | F26B 23/022 110/342 |
| 8,480,789 | B2 * | 7/2013 | Sorensen | B01D 53/229 55/338 |
| 8,999,036 | B2 * | 4/2015 | Pierce | B01D 53/002 95/45 |
| 2007/0095536 | A1 * | 5/2007 | Vinegar | C10G 1/002 166/302 |
| 2008/0197012 | A1 * | 8/2008 | Berruti | C10B 47/24 201/31 |
| 2015/0284811 | A1 * | 10/2015 | Knight | E21B 47/1015 506/2 |

* cited by examiner

SYSTEM FOR ELECTRICITY GENERATION BY UTILIZING FLARED GAS

BACKGROUND

1. Technical Field of Invention

The embodiments herein generally relate to an electricity generation system and particularly relate to a system for electricity generation by utilizing flared gas. The embodiments herein more particularly relate to a readily transportable system installed at a gas station as well as sites of combustible gas leakage and using a leaking gas to generate an electrical or mechanical energy.

2. Description of Related Art

A gas flare, alternatively known as a flare stack, is a gas combustion device used in industrial plants such as petroleum refineries, chemical plants, natural gas processing plants as well as at oil or gas production sites having oil wells, gas wells, offshore oil and gas rigs and landfills. In industrial plants, flare stacks are primarily used for burning off flammable gas released by pressure relief valves during unplanned over-pressuring of plant equipment. During plant or partial plant startups and shutdowns, flare stacks are also often used for the planned combustion of gases over relatively short periods.

An engine-generator is the combination of an electrical generator and an engine (prime mover) mounted together to form a single piece of equipment. This combination is also called an engine-generator set or a gen-set. In many contexts, the engine is taken for granted and the combined unit is simply called a generator. The engine-generators are available in a wide range of power ratings. These include small, hand-portable units that can supply several hundred watts of power, hand-cart mounted units, as pictured below, that can supply several thousand watts and stationary or trailer-mounted units that can supply over a million watts. Regardless of the size, generators may run on gasoline, diesel, natural gas, propane, bio-diesel, water, sewage gas or hydrogen. Most of the smaller units are built to use gasoline (petrol) as a fuel, and the larger ones have various fuel types, including diesel, natural gas and propane (liquid or gas). Some engines may also operate on diesel and gas simultaneously (bi-fuel operation).

One of the prior arts discloses a wellhead gas recovery system and method for the generation of power from wellhead gas. A gas conduit is used to direct wellhead gas from a wellhead casing or wellhead bore to a Stirling engine where the wellhead gas is used as the fuel source for the Stirling engine. The wellhead gas is ignited and the burning wellhead gas is used as the heat source for the Stirling engine. The thermal energy from the burning wellhead gas is transferred into motion by the Stirling engine and the output of the Stirling engine can be used to drive devices at the wellsite, to generate electricity or other use.

Another prior art discloses systems and methods for recovering energy from flare gases in chemical plants and refineries. The method for recovering energy comprises diverting at least a portion of a flare gas from a flare header to form a diverted flare gas. The flare header is fluidically coupled between a process vessel and a flare in a chemical plant, a refinery, or a combined plant; combusting the diverted flare gas in a power generation system to generate power. The system for recovering energy from a flare gas, comprises a flare system comprising a flare and a flare header, a power generation system configured to burn the flare gas, and to produce power, a conduit configured to transfer at least a portion of the flare gas from the flare header to the power generation system. The flare header fluidically couples the flare to a process vessel in a chemical plant, a refinery, or a combination thereof.

Yet another prior art discloses a microturbine power generating system comprising a turbine for converting gaseous heat energy into mechanical energy, a power converter for converting the mechanical energy produced by the turbine into electrical energy and a single tieshaft having a diameter of less than about one-half inch, the tieshaft connecting the turbine and the rotating portion of the power converter. The power converter having a rotating portion and a non-rotating portion. During operation of the microturbine power generating system, said tieshaft, turbine and rotating portion of the power converter rotate in unison at speeds of at least about 60,000 rpm. The microturbine power generating system further comprises a combustor for producing gaseous heat energy by igniting an air and fuel mixture, a fuel supply for supplying fuel to the combustor and a compressor for compressing intake air and supplying the compressed air to the combustor. The compressor being coupled to the tieshaft. During operation of the microturbine power generating system, rotating in unison with said tieshaft, turbine and rotating portion of the power converter. The fuel is selected from the group consisting of diesel, flare gas, off gas, gasoline, naphtha, propane, JP-8, methane, and natural gas.

The flare gas leaks at a plurality of places in a plurality of spots at an oil well site as well as a plurality of other sites. The prior arts get limited in providing a portable apparatus and system for tapping the flare gases on a plurality of spots and utilize it for generation of electricity. Also few prior arts intend to utilize the flare gases for electricity generation but are limited to specific power output due to which the untapped electricity remains unused and hence, the prior arts allow an energy dissipation which reduces an overall efficiency of a system.

In the view of foregoing, there is a need for a system for collecting a flare gas and generate an electricity in real time. Also there is a need for a system to facilitate a secondary usage of the electrical power generated. Further there is a need for a system with portable assembly to enhance mobility and implement the same system on a plurality of sites.

The above mentioned shortcomings, disadvantages and problems are addressed herein, as detailed below.

SUMMARY OF THE INVENTION

The primary object of the embodiments herein is to provide a system for collecting a flare gas and generate an electricity in real time.

Another object of the embodiments herein is to provide a system to facilitate a secondary usage of the electrical power generated.

Yet another object of the embodiments herein is to provide a system with portable assembly to be implemented at a plurality of sites. The portable assembly allows a part or complete system to be transported to a plurality of spots on a same oil well site or a plurality of oil well sites as well as a plurality of places having combustible natural gas leakage from the earth's crust.

The various embodiments herein provide a system for collecting flare gas and using the same for electricity generation. The system comprises a flare gas collector assembly, an electricity generator, a divider circuit, a battery pack, a primary pump, a centrifuge, a secondary pump, a filtration assembly and a transportation assembly. The flare gas collector assembly is attached in-line with a flare stack pipeline. The flare gas collector assembly comprises a collector tank. The electric generator comprises a combustion engine and at-least one alternator. An intake valve of the combustion engine is connected to the collector tank through an intake pipeline. The electricity generator further comprises an output shaft connected to a crankshaft of the combustion engine. The at-least one alternator is connected to the output shaft of the combustion engine through a transmission mechanism. The divider circuit comprises a current divider circuit and a voltage divider circuit. The divider circuit is connected to an output node of the alternator. The battery pack is connected to the at-least one alternator through the divider circuit followed by a filter circuit. The primary pump is connected to the output node of the at-least one alternator through the divider circuit for pumping water from ground to a primary reservoir. The centrifuge is connected to the output node of the at-least one alternator through the divider circuit. The centrifuge receives water from the primary reservoir through the primary pump. The centrifuge separates the received water from undissolved solids. A water with total undissolved salts (TDS) is transferred to a secondary reservoir. The water from the secondary reservoir is pumped into the filtration assembly. The filtration assembly is powered through the electricity generator. The transportation assembly houses and transports the flare gas collector assembly, the electric generator, the divider circuit, the battery pack, the primary pump, the centrifuge and the filtration assembly.

According to an embodiment herein, the electricity generator is capable of producing an output power of at-least 250 KVA.

According to an embodiment herein, the divider circuit limits a required charging current and voltage to the battery pack and distributes an extra power generated from alternator to the centrifuge, the primary pump, the secondary pump and the filtration assembly.

According to an embodiment herein, the system further comprises a transmission panel and a remote monitoring panel. The transmission panel is mounted onto the transportation assembly and records a working of the flare gas collector assembly, the electric generator, the divider circuit, the battery pack, the primary pump, the centrifuge and the filtration assembly. The monitoring panel receives a data transmitted from the transmission panel.

According to an embodiment herein, the transmission panel sends a monitored data about a health and a functional stability of the flare gas collector assembly, the electric generator, the divider circuit, the battery pack, the primary pump, the centrifuge and the filtration assembly to the monitoring panel in real time.

According to an embodiment herein, the transmission panel sends a monitored data about a health and a functional stability of the flare gas collector assembly, the electric generator, the divider circuit, the battery pack, the primary pump, the centrifuge and the filtration assembly to the monitoring panel in non-real time as recorded data.

According to an embodiment herein, the monitoring panel provides a manual control of an operation of the flare gas collector assembly, the electric generator, the divider circuit, the battery pack, the primary pump, the centrifuge and the filtration assembly.

According to an embodiment herein, the monitoring panel automatically controls an operation of the flare gas collector assembly, the electric generator, the divider circuit, the battery pack, the primary pump, the centrifuge and the filtration assembly through an autonomous computer readable program.

According to an embodiment herein, the flare gas collector assembly, the electric generator, the divider circuit, the battery pack, the primary pump, the centrifuge and the filtration assembly work dependently as well as independently of each other.

According to an embodiment herein, the system further comprises a compressor. The compressor is fed with the collected flare gas from the flare gas collector assembly. The compressor compresses the flare gas to a predefined ratio and transfers the compressed gas to the electricity generator.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

DETAILED DESCRIPTION OF THE DRAWINGS

Figure 1:
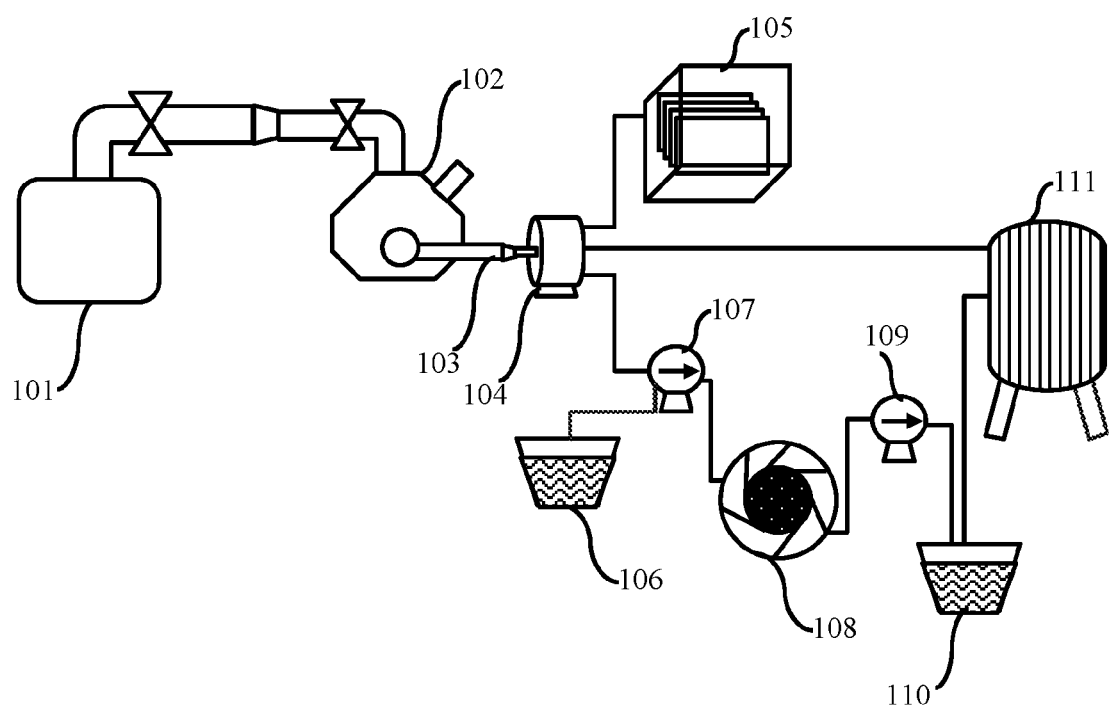
FIG. 1 illustrates a schematic diagram of the system for collecting flare gas and using the same for electricity generation for storage and a plurality of secondary usage, according to one embodiment herein.

In the following detailed description, a reference is made to the accompanying drawings that form a part hereof, and in which the specific embodiments that may be practiced is shown by way of illustration. The embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a system for collecting flare gas and using the same for electricity generation. The system comprises a flare gas collector assembly, an electricity generator, a divider circuit, a battery pack, a primary pump, a centrifuge, a secondary pump, a filtration assembly and a transportation assembly. The flare gas collector assembly is attached in-line with a flare stack pipeline. The flare gas collector assembly comprises a collector tank. The electric generator comprises a combustion engine and at-least one alternator. An intake valve of the combustion engine is connected to the collector tank through an intake pipeline. The electricity generator further comprises an output shaft connected to a crankshaft of the combustion engine. The at-least one alternator is connected to the output shaft of the combustion engine through a transmission mechanism. The divider circuit comprises a current divider circuit and a voltage divider circuit. The divider circuit is connected to an output node of the alternator. The battery pack is connected to the at-least one alternator through the divider circuit followed by a filter circuit. The primary pump is connected to the output node of the at-least one alternator through the divider circuit for pumping water from ground to a primary reservoir. The centrifuge is connected to the output node of the at-least one alternator through the divider circuit. The centrifuge receives water from the primary reservoir through the primary pump. The centrifuge separates the received water from undissolved solids. A water with total undissolved salts (TDS) is transferred to a secondary reservoir. The water from the secondary reservoir is pumped into the filtration assembly. The filtration assembly is powered through the electricity generator. The transportation assembly houses and transports the flare gas collector assembly, the electric generator, the divider circuit, the battery pack, the primary pump, the centrifuge and the filtration assembly.

According to an embodiment herein, the electricity generator is capable of producing an output power of at-least 250 KVA.

According to an embodiment herein, the divider circuit limits a required charging current and voltage to the battery pack and distributes an extra power generated from alternator to the centrifuge, the primary pump, the secondary pump and the filtration assembly.

According to an embodiment herein, the system further comprises a transmission panel and a remote monitoring panel. The transmission panel is mounted onto the transportation assembly and records a working of the flare gas collector assembly, the electric generator, the divider circuit, the battery pack, the primary pump, the centrifuge and the filtration assembly. The monitoring panel receives a data transmitted from the transmission panel.

According to an embodiment herein, the transmission panel sends a monitored data about a health and a functional stability of the flare gas collector assembly, the electric generator, the divider circuit, the battery pack, the primary pump, the centrifuge and the filtration assembly to the monitoring panel in real time.

According to an embodiment herein, the transmission panel sends a monitored data about a health and a functional stability of the flare gas collector assembly, the electric generator, the divider circuit, the battery pack, the primary pump, the centrifuge and the filtration assembly to the monitoring panel in non-real time as recorded data.

According to an embodiment herein, the monitoring panel provides a manual control of an operation of the flare gas collector assembly, the electric generator, the divider circuit, the battery pack, the primary pump, the centrifuge and the filtration assembly through an autonomous computer readable program.

According to an embodiment herein, the monitoring panel automatically controls an operation of the flare gas collector assembly, the electric generator, the divider circuit, the battery pack, the primary pump, the centrifuge and the filtration assembly.

According to an embodiment herein, the flare gas collector assembly, the electric generator, the divider circuit, the battery pack, the primary pump, the centrifuge and the filtration assembly work dependently as well as independently of each other.

According to an embodiment herein, the system further comprises a compressor. The compressor is fed with the collected flare gas from the flare gas collector assembly. The compressor compresses the flare gas to a predefined ratio and transfers the compressed gas to the electricity generator.

FIG. 1 illustrates a schematic diagram of the system for collecting flare gas and using the same for electricity generation for storage and a plurality of secondary usage, according to one embodiment herein. With respect to FIG. 1, the flare gas collector assembly 101 is installed in a close proximity of the flare stack pipeline at an oil well site. The flare gas is directly collected to the flare gas collector assembly 101 from the leaking pipeline or through a secondary pipeline connected before combustion chimney provided for burning of the flare gas leaked from the pipeline in the oil well. The collected flare gas is transferred to the combustion engine 102 of the electricity generator through the intake valve. The intake valve is connected to the flare gas collector assembly 101 through a non-returning valve (NRV). The combustion engine 102 combusts the flare gas to generate a mechanical output that is transferred to the alternator 104 through the crank shaft and the output shaft 103. The alternator 104 is connected to the divider circuit (not shown). The divider circuit monitors a load on the alternator 104 comprising the battery pack 105, the primary pump 107, the secondary pump 109, the centrifuge 108 and the filtration assembly 111. The divider circuit limits the current and voltage to the battery pack and redirects an extra power generated by the alternator 104 to the primary pump 107, the secondary pump 109, the centrifuge 108 and the filtration assembly 111 on the basis of their power requirement. The primary pump 107 is connected to the output node of the alternator 104 through the divider circuit for pumping water from ground to the primary reservoir 106 through a plurality of returning valves. The centrifuge 108 is connected to the output node of the alternator 104 through the divider circuit. The centrifuge 108 receives water from the primary reservoir 106 through the primary pump 107. The centrifuge 108 separates a water from undissolved solids. A water with total undissolved salts (TDS) is transferred to the secondary reservoir 110. A water from the secondary reservoir 110 is pumped into the filtration assembly 111. The filtration assembly 111 is powered through the electricity generator. The transportation assembly houses and transports the flare gas collector assembly 101, the electric generator, the divider circuit, the battery pack 105, the primary pump 107, the centrifuge 108 and the filtration assembly 111.

Figure 2:
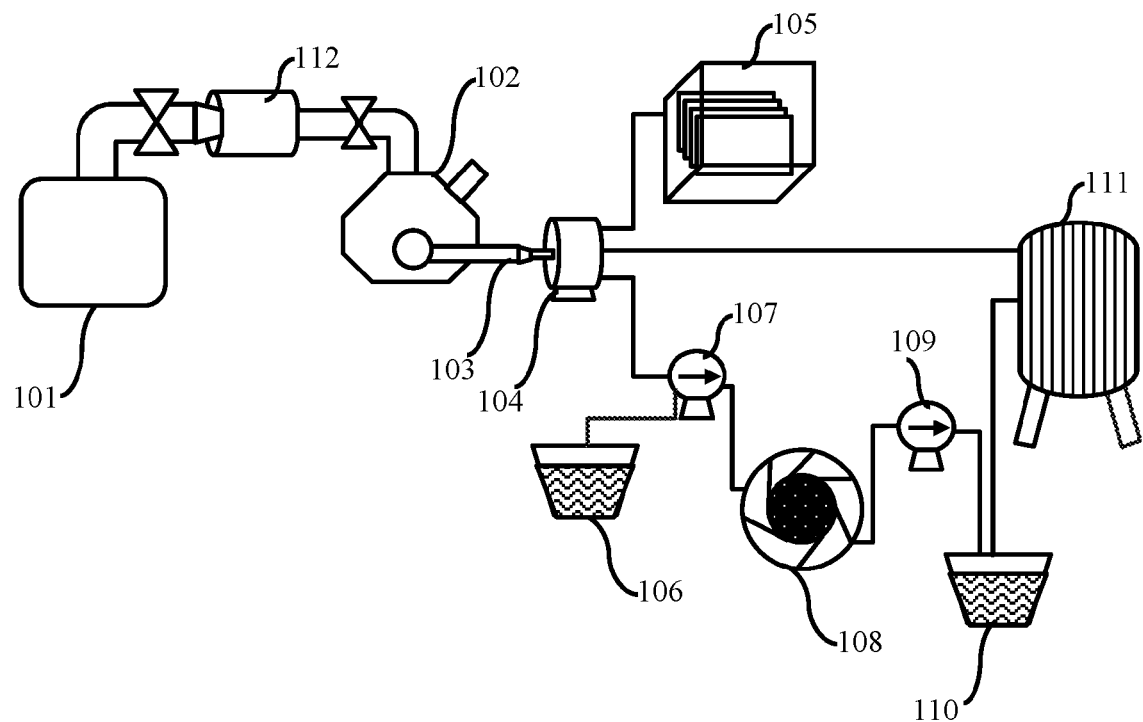
FIG. 2 illustrates a schematic diagram of the system for collecting flare gas and using the same for electricity generation for storage and a plurality of secondary usage with a compressor, according to one embodiment herein.

FIG. 2 illustrates a schematic diagram of the system for collecting flare gas and using the same for electricity generation for storage and a plurality of secondary usage with a compressor, according to one embodiment herein. With respect to FIG. 2, the flare gas collector assembly 101 is connected to the combustion engine 102 through a compressor 112 if the compression ratio of the combustion engine 102 is lower that the required for optimum combustion of the flare gas. The compressor 112 is connected to the flare gas collector assembly 101 through a non-returning valve.

According to one embodiment herein, the system is implemented primarily at oil well sites and additionally to a zone with leakage of natural gas or combustible gas.

According to one embodiment herein, the transmission panel is connected to a plurality of electro-mechanical actuators. The plurality of electromechanical actuators are controlled through a command code sent from the monitoring panel during a manual control operation. For an automated control operation, a prestored computer readable program interacts with the data sent from the transmission panel and matches the instantaneous data with an ideal working condition data. The ideal working condition data is taken as a reference data and a deviation from the reference data initiates an alarm mode. The alarm mode is a stand-by mode for the actuators in which a predetermined amount of power is diverted to the actuators for bringing the working of the system within safe limits as determined by the reference data.

The present system provides a power generation and usage from the waste flare gas which is normally burnt into atmosphere and leads to air pollution. The present system also provides battery charging at real time to be used for off-site purpose such as household works and automobiles. The present system also provides real time secondary usage of the extra power generated from the alternator in water pumping, storage and filtration. Also the assembly of the present system comprising the flare gas collector assembly, the electric generator, the divider circuit, the battery pack, the primary pump, the centrifuge and the filtration assembly work dependently as well as independently of each other facilitating their implementation at a same site or on different sites simultaneously.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims.

We claim:

1. A system for collecting flare gas and using the same for electricity generation comprising:
    a flare gas collector assembly, wherein the flare gas collector assembly is attached in-line with a flare stack pipeline, wherein the flare gas collector assembly comprises a collector tank;
    an electricity generator, wherein the electric generator comprises:
        a combustion engine, wherein an intake valve of the combustion engine is connected to the collector tank through an intake pipeline, wherein the electricity generator further comprises an output shaft connected to a crankshaft of the combustion engine; and
        at least one alternator, wherein the at least one alternator is connected to the output shaft of the combustion engine through a transmission mechanism;
    a divider circuit, wherein the divider circuit comprises a current divider circuit and a voltage divider circuit, wherein the divider circuit is connected to an output node of the at-least one alternator;
    a battery pack, wherein the battery pack is connected to the at-least one alternator through the divider circuit followed by a filter circuit;
    a primary pump, wherein the primary pump is connected to the output node of the at-least one alternator through the divider circuit for pumping water from ground to a primary reservoir;
    a centrifuge, wherein the centrifuge is connected to the output node of the at-least one alternator through the divider circuit, wherein the centrifuge receives water from the primary reservoir through a secondary pump, wherein the centrifuge separates the received water from undissolved solids, wherein a water with total undissolved salts (TDS) is transferred to a secondary reservoir;
    a filtration assembly, wherein the water from the secondary reservoir is pumped into the filtration assembly, wherein the filtration assembly is powered through the electricity generator; and
    a transportation assembly, wherein the transportation assembly houses and transports the flare gas collector assembly, the electric generator, the divider circuit, the battery pack, the primary pump, the centrifuge and the filtration assembly.

2. The system according to claim 1, wherein the electricity generator is capable of producing an output power of at-least 250 KVA.

3. The system according to claim 1, wherein the divider circuit limits a required charging current and voltage to the battery pack and distributes an extra power generated from the at-least one alternator to the centrifuge, the primary pump and the secondary pump and the filtration assembly.

4. The system according to claim 1 further comprises a transmission panel and a remote monitoring panel, wherein the transmission panel is mounted onto the transportation assembly and records a working of the flare gas collector assembly, the electric generator, the divider circuit, the battery pack, the primary pump, the centrifuge and the filtration assembly, wherein the monitoring panel receives a data connected to the transmission panel.

5. The system according to claim 4, wherein the transmission panel sends a monitored data about a health and a functional stability of the flare gas collector assembly, the electric generator, the divider circuit, the battery pack, the primary pump, the centrifuge and the filtration assembly to the monitoring panel in real time.

6. The system according to claim 4, wherein the transmission panel sends a monitored data about a health and a functional stability of the flare gas collector assembly, the electric generator, the divider circuit, the battery pack, the primary pump, the centrifuge and the filtration assembly to the monitoring panel in non-real time as recorded data.

7. The system according to claim 4, wherein the monitoring panel provides a manual control of an operation of the flare gas collector assembly, the electric generator, the divider circuit, the battery pack, the primary pump, the centrifuge and the filtration assembly.

8. The system according to claim 4, wherein the monitoring panel automatically controls an operation of the flare gas collector assembly, the electric generator, the divider circuit, the battery pack, the primary pump, the centrifuge and the filtration assembly through an autonomous computer readable program.

9. The system according to claim 1, wherein the flare gas collector assembly, the electric generator, the divider circuit, the battery pack, the primary pump, the centrifuge and the filtration assembly work dependently as well as independently of each other.

10. The system according to claim 1 further comprises a compressor, wherein the compressor is fed with the collected flare gas from the flare gas collector assembly, wherein the compressor compresses the flare gas to a predefined ratio and transfers the compressed gas to the electricity generator.

* * * * *